Oct. 13, 1931.  A. M. ALGEO ET AL  1,827,553
TRANSFER APPARATUS
Filed Aug. 14, 1925  3 Sheets-Sheet 1

Inventors
ALBERT M. ALGEO,
GEORGE R. HAUB,
AND JAMES W. ROSS,

By Eccleston & Eccleston,
Attorneys

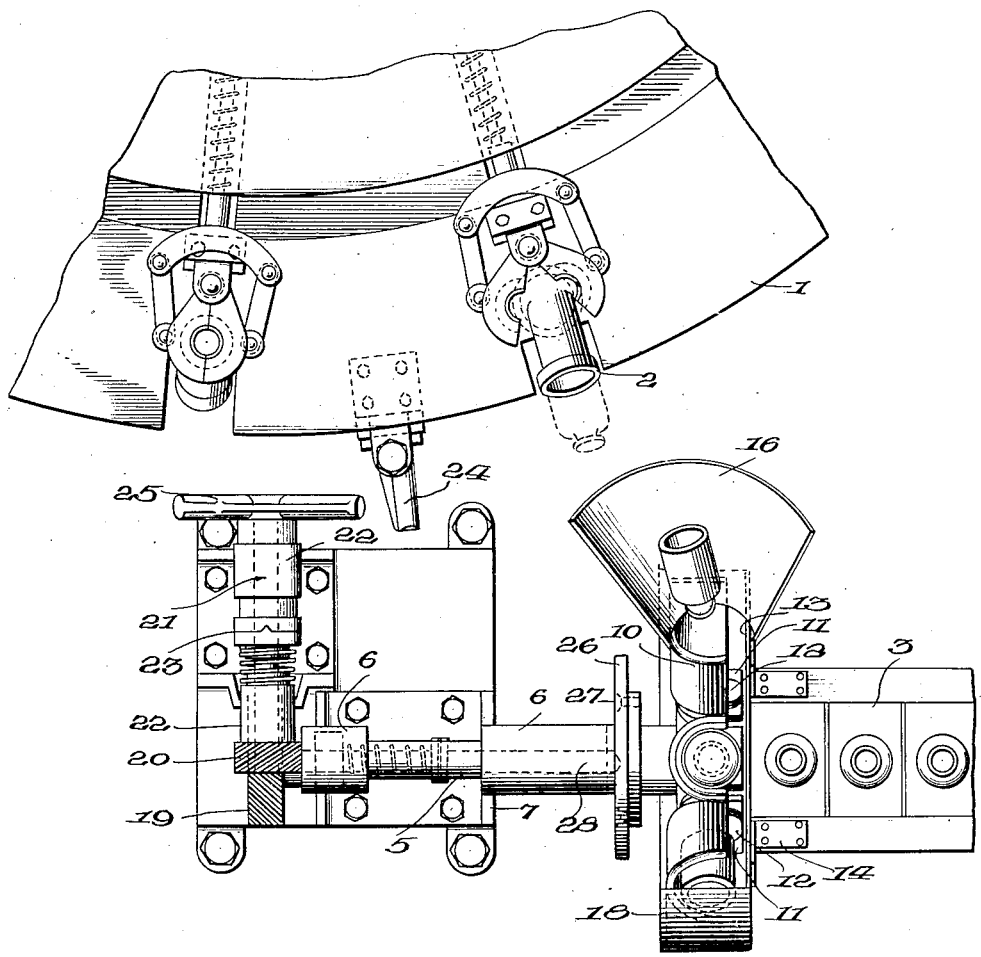

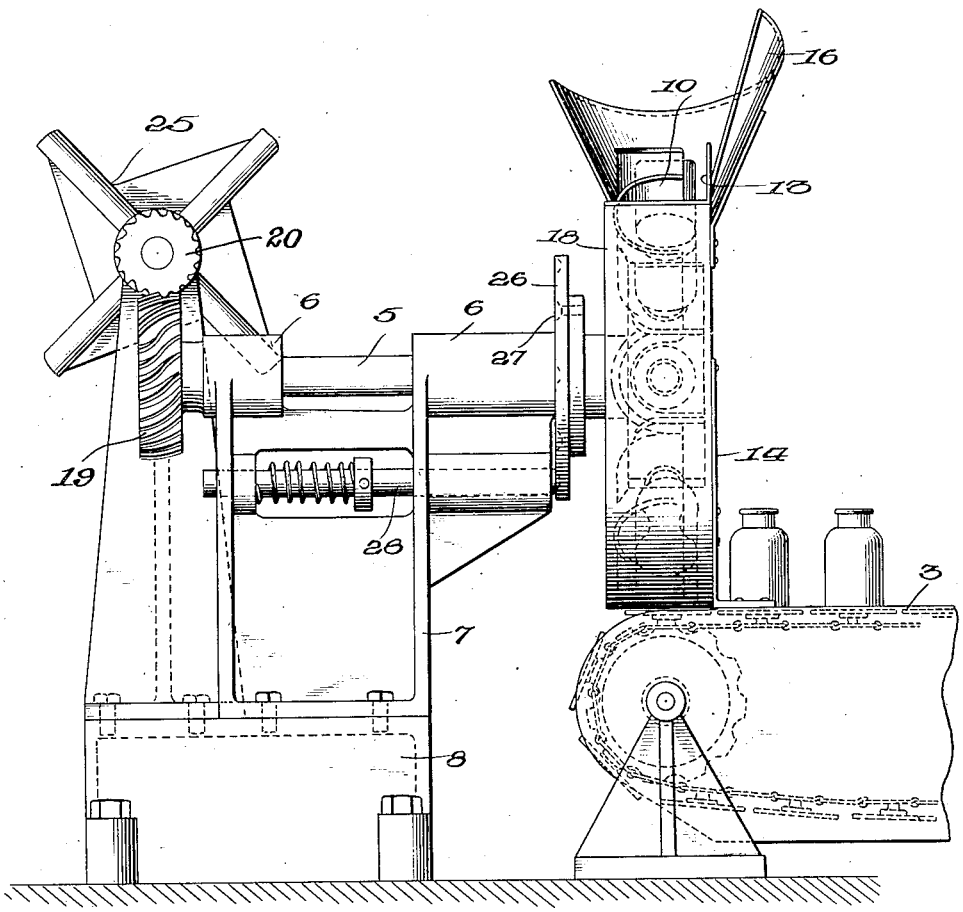

Patented Oct. 13, 1931

1,827,553

UNITED STATES PATENT OFFICE

ALBERT M. ALGEO, GEORGE R. HAUB, AND JAMES W. ROSS, OF WASHINGTON, PENNSYLVANIA, ASSIGNORS TO HAZEL-ATLAS GLASS CO., OF WHEELING, WEST VIRGINIA, A CORPORATION OF WEST VIRGINIA

TRANSFER APPARATUS

Application filed August 14, 1925. Serial No. 50,332.

This invention relates to the handling of glassware and has special reference to the provision of mechanical means for receiving the ware from a forming machine of either the intermittent or continuous type and placing the same in an upright position upon a conveyor.

Heretofore mechanisms have been provided for accomplishing this result but such mechanisms have been either too complex to be commercially successful or else were inherently defective in that the ware was not handled with such care as is necessary in connection with articles coming directly from the molds, that is, unannealed ware. Accordingly it is an object of the present invention to provide such a mechanism which is comparatively simple in construction and operation and one which will receive the ware from the molds and transport it to the conveyor without shocks or jars at any stage of the operation.

Other objects and advantages of the invention will be apparent to those skilled in the art from the following description when taken in connection with the accompanying drawings, in which:

Figure 2 is a plan view of the apparatus, and;

Figure 3 is a side elevation thereof in co-operative relation to the conveyor.

Figure 1:
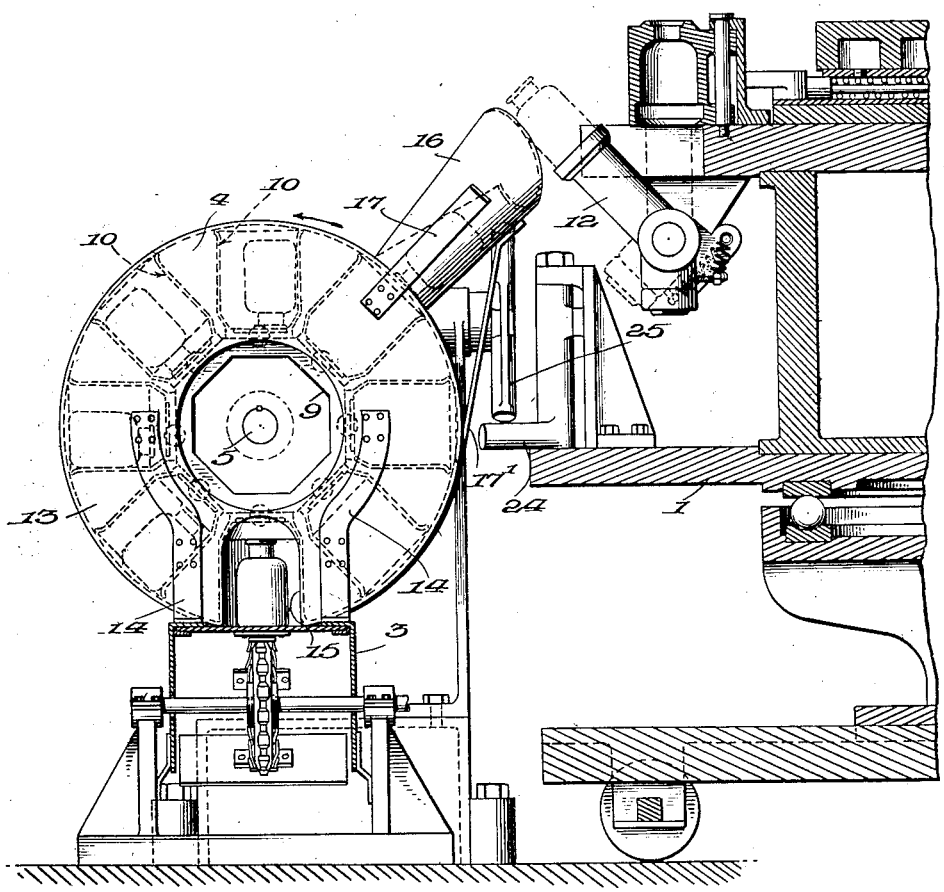
Figure 1 is a front elevation of the transfer apparatus, the same being shown in operative relation to the forming machine and conveyor, these latter devices being shown in fragmentary section.

In the drawings the numeral 1 refers to a rotary glass machine of either the continuous or intermittent type, and relates to the present invention only insofar as the operating means for the transfer mechanism is concerned, and in means such as a tiltable or swingable mold bottom 2 for placing the ware on the transfer apparatus, from which it is received by an endless conveyor 3 for transporting it to a selected point.

The transfer mechanism itself is of rather simple construction and consists essentially of a rotary carrier indicated generally by numeral 4 and provided with a plurality of pockets or receptacles for individually receiving the articles from the glass machine in an inverted position and depositing them on the conveyor in an upright position.

The carrier 4 is fixedly secured to a horizontal shaft 5 which is rotatably mounted in bearings 6 formed on the bracket or standard 7, the latter being anchored to a base or pedestal 8 located adjacent the forming machine. This carrier is secured to the end of shaft 5 nearest the conveyor 3 and comprises a drum 9 keyed to shaft 5 and around which are secured a plurality of pockets or receptacles 10 adapted to receive the articles manufactured by the forming machine. Each receptacle 10 is formed with an open side and top and is of a substantially semi-cylindrical shape. The bottoms 11 of these receptacles are each provided with a pad or lining 12, preferably of asbestos, adapted to give a cushioning effect to the article deposited therein.

In order that the ware deposited in the several pockets may be retained therein we have provided a substantially circular closure 13 which is supported adjacent the open sides of the pockets by means of brackets 14 secured to the casing of the conveyor 3. This closure member is formed with an opening 15 of sufficient size to permit the ware to be laterally removed from the side openings of the pockets or receptacles in a manner to be later described. It will be apparent that the ware being deposited in the receptacles is guided thereto by the chute 16 which is radially attached to the casing 13 by means of brackets 17 and 17'. The articles thus deposited are conveyed to the left (Fig. 1) as the carrier rotates in the direction of the arrow and in order that they may be prevented from being prematurely discharged through the open ends of the receptacles a curved guard 18 is provided which extends from a point adjacent the top of the carrier to the opening 15. This guard may be integrally formed as a part of the closure 13 if desired, the closure and guard together constituting a casing for the carrier.

The mechanism will now be described by which the carrier is rotated in synchronism with the forming machine and caused to assume a predetermined relation with respect thereto each time an article is to be deposited.

On the end of shaft 5 opposite the carrier 4 is a gear wheel 19 which is in mesh with gear wheel 20 carried by the adjacent end of the shaft 21. This shaft is mounted in bearing 22 and is provided with a spring-pressed safety clutch 23 adapted to prevent injury to the mechanism should the carrier or related parts become jammed. As hereinbefore stated the transfer mechanism should be in perfect synchronism with the forming machine and to this end the latter is provided with radially extending pins 24 corresponding in number with the molds on the machine, and adapted for engagement with the arms of a star wheel 25 fixed to the end of shaft 21. Obviously, rotation of the mold table will impart an intermittent movement to the carrier 4 through the mechanism just described. It is necessary, however, that the pockets be in alignment with the chute 16 and also the opening 15 when the carrier is at rest, and to accomplish this purpose the shaft 5 carries a disc 26 provided with an annular series of depressions 27 for cooperation with the spring-pressed plunger or pawl 28. The depressions 27, of course, are so disposed around disc 26 as to cause the pockets 10 to assume the proper relation to the chute 16 when the particular depression is engaged by the end of the plunger 28.

In operation, after a bottle is deposited in one of the receptacles 10, a pin 24 will engage one of the arms of the star wheel 25 causing a fractional rotation thereof and consequently a movement of the carrier to bring the next receptacle into alignment with the chute, the plunger 28 operating to cause proper registration of the parts. The articles deposited will be received on cushioning pads 12 and as they progress to the left (Fig. 1) will be prevented from falling out of the respective pockets by means of the guard 18 and closure 13. As the filled pocket approaches the bottom of the apparatus the article therein will, of course, be slid along the guard 18 until the conveyor 3 is reached. At this time the article is moved onto the conveyor and is then carried laterally from the receptacle through the open side thereof by movement of the conveyor which will then transport the same to the desired point.

It will thus be observed that we have devised an exceedingly simple construction by which the ware is received from the fabricating machine and deposited on a conveyor without shocks or jars; that the mechanism is in perfect synchronism with the fabricating machine; that its operation is entirely automatic; and that it is fully safeguarded against injury by jamming and the like.

In accordance with the patent statutes we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. In a transfer mechanism for transferring bottles from a forming machine to a conveyer, a rotary carrier having pockets to receive the bottles in neck-down position, means for directing the bottles radially into said carrier, and a mechanical conveyer for removing the bottles laterally from said carrier in neck-up position.

2. In a transfer mechanism for transferring bottles from a forming machine to a conveyer, a carrier mounted for rotation in a substantially vertical plane and having pockets to receive the bottles in neck-down position, means for directing the bottles radially into said carrier at a point adjacent the top thereof, and a mechanical conveyer for removing the bottles laterally from said carrier at the bottom thereof in neck-up position.

3. In a transfer mechanism for transferring bottles from a forming machine to a conveyer, a carrier including a receptacle to receive a bottle in neck-down position, said receptacle provided with an open end and side, means for directing a bottle into the receptacle through its open end, and a mechanical conveyer for removing the bottle in neck-up position through its open side.

4. In a transfer mechanism for transferring bottles from a forming machine to a conveyer, a rotary carrier including a plurality of open-sided receptacles to receive bottles in neck-down position, an arcuate plate adapted to close the open sides of said receptacles throughout a portion of the path of travel of said receptacles, and a mechanical conveyer for removing the bottles through the open sides of said receptacles in neck-up position.

5. In a transfer mechanism for transferring bottles from a forming machine to a conveyer, a substantially annular casing having an opening at the lower edge thereof, a rotary carrier including a plurality of receptacles to receive bottles in neck-down position, each receptacle provided with an open end and side for cooperation with said casing, means for directing the bottles into said receptacles through the open ends thereof, and a mechanical conveyer for removing the bottles in neck-up position through the open sides of said receptacles when the latter are in registration with the opening in said casing.

6. A carrier mounted for rotation in a vertical plane, a plurality of receptacles provided on said carrier to receive formed glass articles from a forming machine, means for intermittently rotating said carrier including a star wheel, said star wheel adapted to be engaged by a forming machine, and means for causing the carrier to assume a predetermined relation to a forming machine at each operation of the carrier.

ALBERT M. ALGEO.
GEORGE R. HAUB.
JAMES W. ROSS.